March 5, 1940.   G. SANGER ET AL   2,192,817
REFLECTOR SIGNAL
Filed July 21, 1937
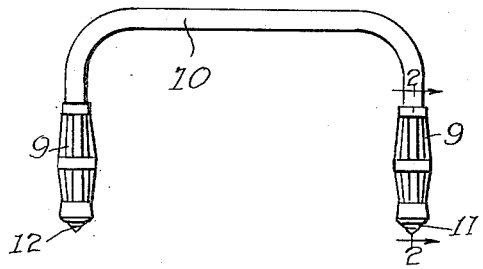
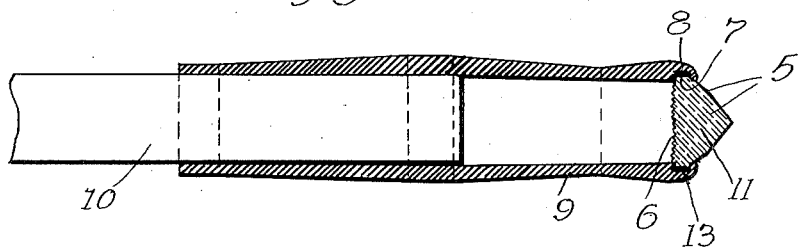
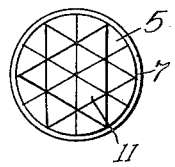
Inventors.
George Sanger.
J. Leonard Herron Patented Mar. 5, 1940

2,192,817

UNITED STATES PATENT OFFICE 2,192,817

REFLECTOR SIGNAL

George Sanger and John Leonard Herron, Chicago, Ill.; said Herron assignor of one-half to said Sanger Application July 21, 1937, Serial No. 154,834

1 Claim. (Cl. 88—81)

This invention relates in general to a reflector lens preferably in the form of a circular bull's-eye in connection with a holder adapted to be used as a signal for bicycles, automobiles, and the like.

An important object of the invention is in the provision of a signal device in the form of a flexible handle in association with a colored reflector lens or crystal, whereby when a pair of the signal devices is attached to the outer ends of the handle bar of a bicycle the colored lenses will be illuminated by the lights of an approaching automobile to indicate the presence of the bicycle and the direction of movement thereof.

Other and further objects of the invention will appear hereinafter, the accompanying drawing illustrating a preferred embodiment of the invention, in which Fig. 1 represents a handle bar for a bicycle with reflector lenses supported by the hand grips at the ends thereof;

Fig. 2 is a sectional view of one end of the handle bar with the signal device attached, taken on the line 2—2 of Fig. 1; and Fig. 3 is a face view of the reflector lens and its support.

The lens is of the self-reflecting or autocollimator type in which light shining upon the lens is reflected oppositely in the same or substantially the same line. Lenses, reflectors, bull's-eyes, and circular or other buttons, are commonly made in this manner and comprise an outer lens portion 5 with a grating or other roughened back 6 which may also be provided with a mirror surface if desired but which is not necessary for reflector buttons of this type.

These reflectors if made round in shape are formed with a circular rim or rib 7 at the base by means of which the button may be secured in a corresponding under-cut recess 8 at the end of a handle member 9 formed of rubber or other flexible material and adapted to be adhesively secured to a handle bar 10.

When attached in this manner the opposite reflector buttons 11 and 12 are preferably of different or contrasting colors, such as red and green, so that when they are illuminated by a light shining upon them, their reflections may indicate the direction of movement of the bicycle or other vehicle to which they are attached. It is common practice to place a red light or signal on the left side and a green light or signal on the right side, and as the handle bars of a bicycle are usually wide enough to project beyond the sides of a person riding the bicycle these reflections will be visible to the driver of an automobile when he is approaching the bicycle rider from the rear to indicate the direction in which the bicycle is traveling.

In order to secure the reflector buttons more firmly in place the bottom of the groove 8 surrounding the circular rib 7 of the button may be provided with an adhesive, such as glue or cement 13 by which the button is fastened in place at the end of the handle member 9.

By reference to Fig. 2 of the drawing it will be readily apparent that the holder for the reflector lens or crystal is in the general form of a hand grip consisting of a sleeve made of rubber, in the present instance the sleeve being thickened at its middle portion and tapered towards the ends whereby when the inner end of the sleeve or hand grip is slipped over and attached by an adhesive to the end portion of the handle bar said thickened portion will be at the extremity of the handle bar where the greatest strain comes in grasping and flexing the outer free portion. This will position the hand grip on the handle bar so that the outer free portion thereof, which carries the lens or crystal at its outer end, will project beyond the handle bar to be normally supported by its own stiffness, but when this end of the hand grip is placed against any solid support, or hits the ground when the bicycle falls, it will flex or bend and serve to protect the reflector lens or crystal to prevent it from becoming easily broken or damaged.

We claim:

In combination with the handle bar of a bicycle, signal devices attached to the outer ends thereof, each signal device comprising a rubber sleeve thickened at its middle portion from which it tapers towards each end, said sleeve being attached by an adhesive to an outer end of the handle bar so that said handle bar terminates at the thickened middle portion of the sleeve with the outer flexible portion of the latter, beyond the thickened portion thereof, projecting beyond the end of the handle bar, and a reflector lens secured in the outer end of the sleeve.

GEORGE SANGER.
J. LEONARD HERRON.